US007952847B2

(12) United States Patent
Lu

(10) Patent No.: US 7,952,847 B2
(45) Date of Patent: May 31, 2011

(54) LIGHTNING PROTECTION DEVICE

(75) Inventor: Shan-Jui Lu, Xizhi (TW)

(73) Assignee: Lantek Electronics Inc., Taipei County (TW)

( * ) Notice: Subject to any disclaimer, the term of this patent is extended or adjusted under 35 U.S.C. 154(b) by 84 days.

(21) Appl. No.: 12/606,310

(22) Filed: Oct. 27, 2009

(65) Prior Publication Data

US 2011/0038090 A1 Feb. 17, 2011

(30) Foreign Application Priority Data

Aug. 17, 2009 (TW) .............................. 98215115 U

(51) Int. Cl.
*H02H 1/04* (2006.01)
*H02H 3/22* (2006.01)

(52) U.S. Cl. ........................................................ 361/119

(58) Field of Classification Search ................... 361/119
See application file for complete search history.

(56) References Cited

U.S. PATENT DOCUMENTS

| | | | | |
|---|---|---|---|---|
| 4,633,359 | A * | 12/1986 | Mickelson et al. | 361/119 |
| 5,508,873 | A * | 4/1996 | knapp et al. | 361/119 |
| 5,768,084 | A * | 6/1998 | Chaudhry et al. | 361/120 |
| 6,636,408 | B2 * | 10/2003 | Pagliuca | 361/119 |
| 2002/0135963 | A1 * | 9/2002 | Pagliuca | 361/117 |
| 2003/0043525 | A1 * | 3/2003 | Ryman | 361/117 |
| 2005/0146828 | A1 * | 7/2005 | Baker | 361/119 |

* cited by examiner

*Primary Examiner* — Ronald W Leja
(74) *Attorney, Agent, or Firm* — Guice Patents PLLC

(57) ABSTRACT

The present invention relates to a lightning protection device, comprises: a front cover member; a first insulation member; an electric conduction pin; a second insulation member; a connector, a through hole is longitudinally installed in the connector; a gas tube installed in the through hole; a top cover; and a grounding base having a base hole for accommodating the connector and is contact with the top cover, a screw hole is installed at one end of the base hole for fastening a locking member. The mentioned lightning protection device has advantages of utilizing less components, reducing volume and lowering production cost.

17 Claims, 9 Drawing Sheets

LIGHTNING PROTECTION DEVICE

BACKGROUND OF THE INVENTION

1. Field of the Invention

The present invention relates to a lightning protection device, more particularly to a lightning protection device in which a through hole is installed on a connector, and a gas tube is installed in the through hole and the gas tube is in contact with a grounding base through a top cover to achieve the object of lightning protection.

2. Description of Related Art

Referring to FIG. 1, which is a schematic exploded view of a conventional lightning protection device. As shown in the figure, the lightning protection device is a male-male lightning protection device, comprises a main body 200, a printed circuit board 210, two electric discharge tubes 220, 225, a coil 230 and a grounding ring 240. A grounding wire (not shown) is fastened on one end of the main body 200 through a screw; when a lightning strikes, the high voltage is guided to the grounding wire through the coil 230, the electric discharge tubes 220, 225, the grounding ring 240 and the main body 200, so the damage to an electric device caused by the high voltage is reduced. But the above mentioned lightning protection device has following disadvantages: 1. the structure thereof is relatively complex; and 2. the production cost thereof is high.

Referring to FIG. 2, which is a schematic exploded view of another conventional lightning protection device. As shown in the figure, the lightning protection device is a female-female lightning protection device and consists of a main body 300 and a grounding sheet 310. The grounding sheet 310 is directly welded and fastened on the main body 300; when a lightning strikes, the high voltage is guided to the main body 300 through the grounding sheet 310 and the main body 300 for reducing the damage to an electric device caused by the high voltage. The structure of the mentioned lightning protection device is relatively simple compared to what is shown in FIG. 1, but has disadvantages of larger volume and lack of grounding.

SUMMARY OF THE INVENTION

One object of the present invention is to provide a lightning protection device, in which a through hole is installed on a connector, and a gas tube is installed in the through hole and the gas tube is in contact with a grounding base through a top cover to achieve the object of lightning protection.

Another object of the present invention is to provide a lightning protection device, which has advantages of utilizing less components, reducing volume and lowering production cost.

For achieving the objects mentioned above, one solution provided by the present invention is to provide a lightning protection device, comprises: a front cover member that is hollow; a first insulation member that is hollow, one end thereof is received in the front cover member; an electric conduction pin, one end thereof is received in the first insulation member; a second insulation member that is hollow and served to receive the other end of the electric conduction pin; a connector that is hollow and served to accommodate the front cover member, the first insulation member, the electric conduction pin and the second insulation member, a through hole is longitudinally installed in the connector; a gas tube installed in the through hole; a top cover covered on top of the through hole and in contact with one end of the gas tube; and a grounding base having a base hole for accommodating the connector and is contact with the top cover, a screw hole is installed at one end of the base hole for fastening a locking member.

For achieving the objects mentioned above, another solution provided by the present invention is to provide a lightning protection device, comprises: a front cover member that is hollow; a first insulation member that is hollow, one end thereof is received in the front cover member; a printed circuit board; an electric conduction pin, one end thereof is received in the first insulation member and the other end thereof is fastened at one end of the printed circuit board; two electric conduction sheets, respectively in a bended shape, one end thereof is fastened on the other end of the printed circuit board and the front end thereof is in a closed status; a second insulation member that is hollow and served to receive the other ends of the two electric conduction sheets; a connector that is hollow and served to accommodate the front cover member, the first insulation member, the electric conduction pin, the printed circuit board, the two electric conduction sheets and the second insulation member; and a gas tube installed on the printed circuit board and in contact with the connector through a conduction wire.

DETAILED DESCRIPTION OF THE PREFERRED EMBODIMENT

Figure 1:
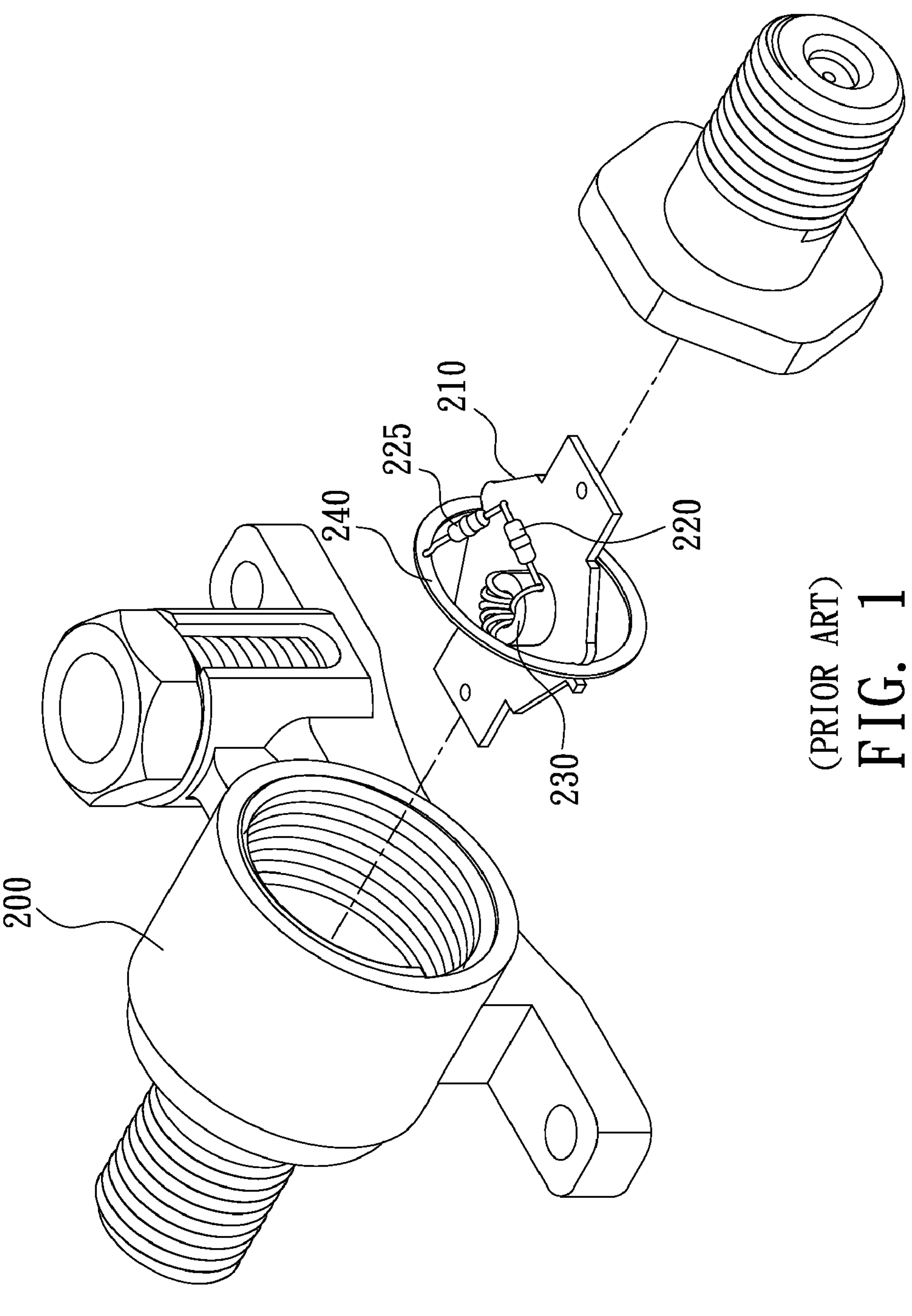
(PRIOR ART) FIG. 1
FIG. 1 is a schematic exploded view of a conventional lightning protection device.
Figure 2:
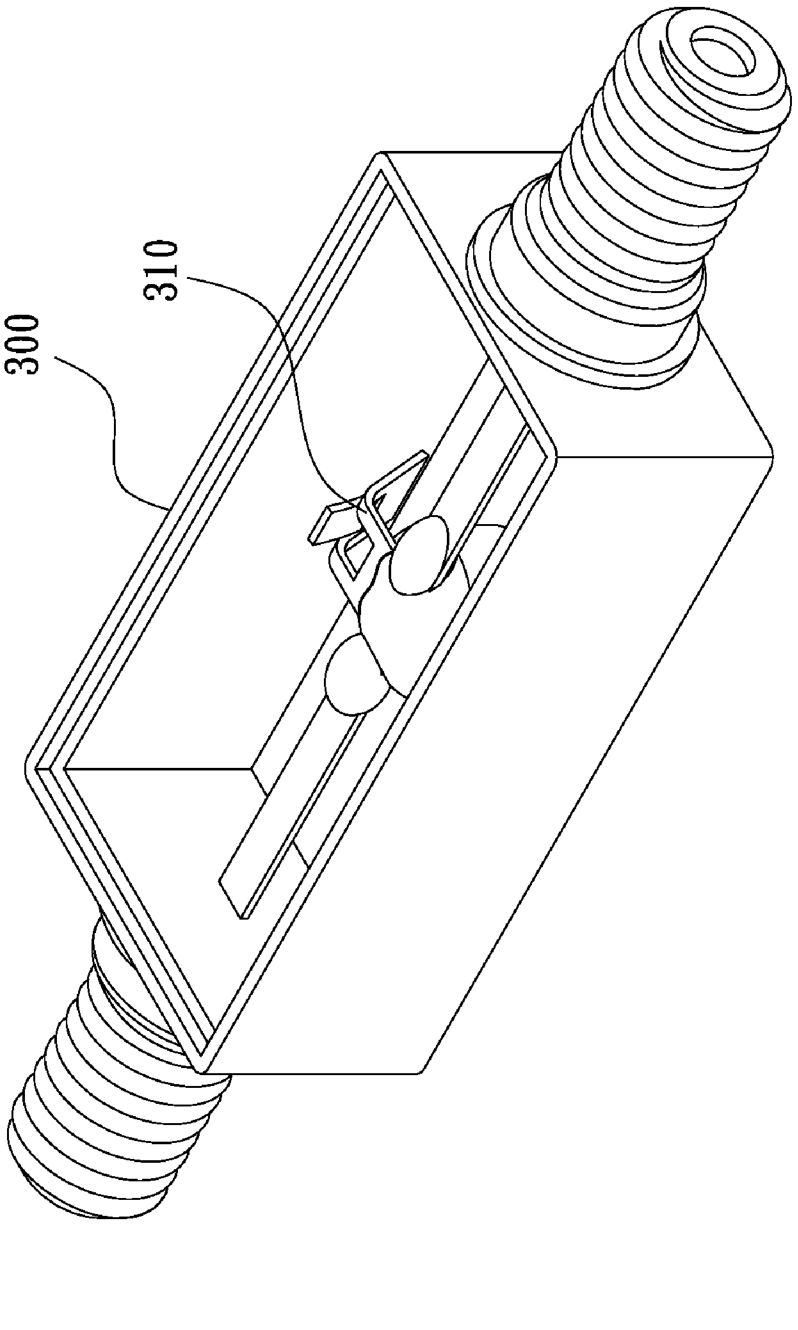
(PRIOR ART) FIG. 2
FIG. 2 is a schematic exploded view of another conventional lightning protection device.
Figure 3:
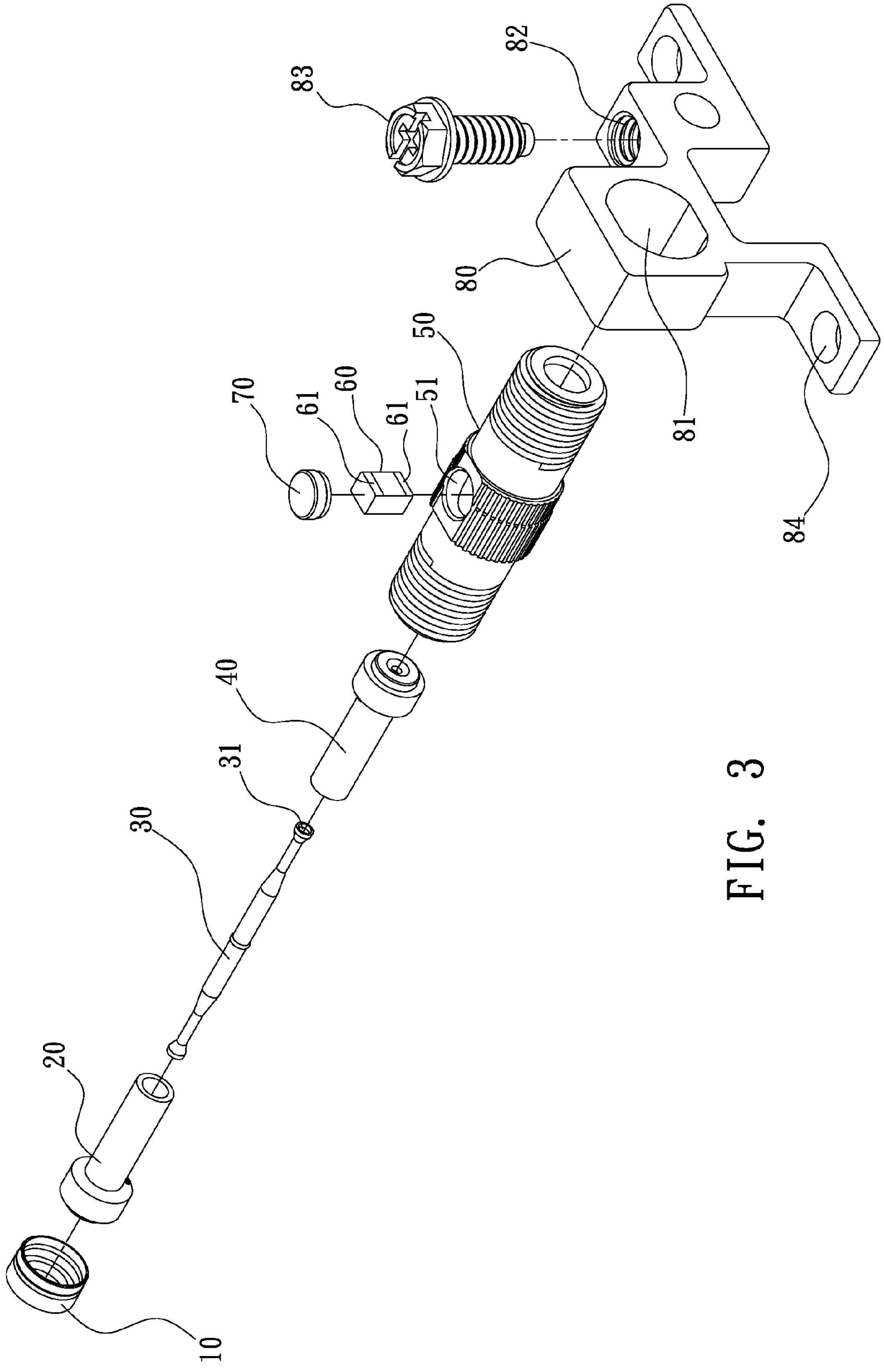
FIG. 3 is a schematic exploded view of a lightning protection device of one preferred embodiment of the present invention.
Figure 4:
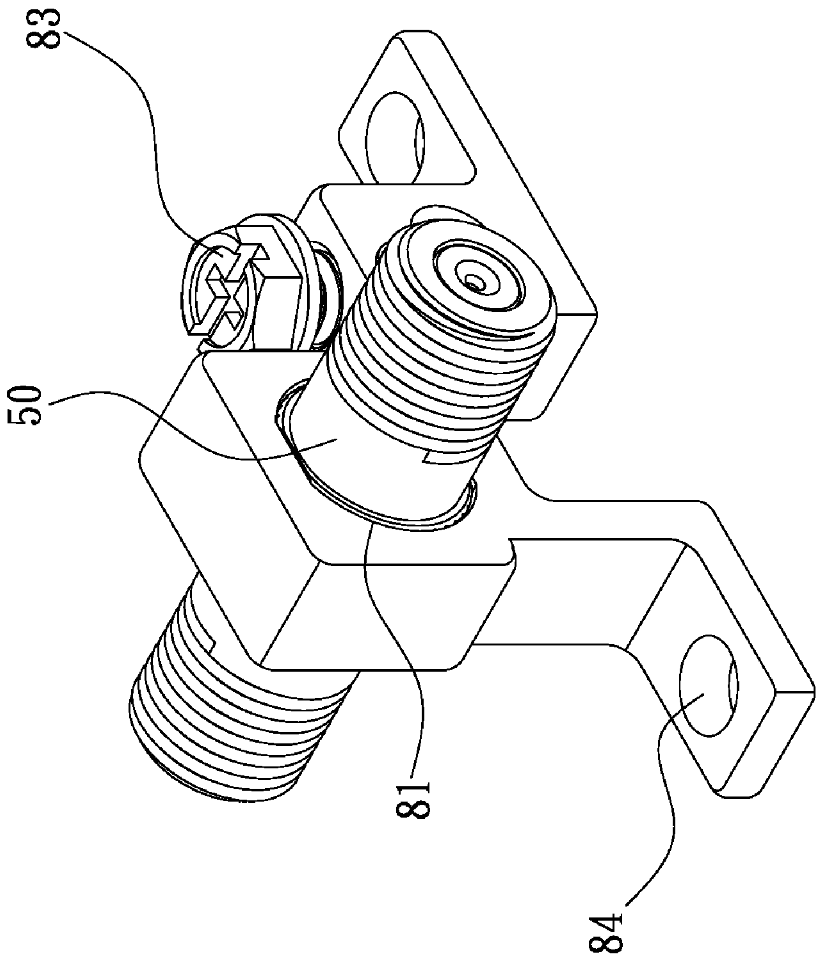
FIG. 4 is a schematic perspective view of the assembly of the lightning protection device of one preferred embodiment of the present invention.

Referring to FIG. 3 and FIG. 4, wherein FIG. 3 is a schematic exploded view of a lightning protection device of one preferred embodiment of the present invention; FIG. 4 is a schematic perspective view of the assembly of the lightning protection device of one preferred embodiment of the present invention.

As shown in figures, the lightning protection device provided by the present invention, more particularly to a female-female lightning protection device, comprises: a front cover member 10; a first insulation member 20; an electric conduction pin 30; a second insulation member 40; a connector 50; a gas tube 60; a top cover 70; and a grounding base 80.

The front cover member 10 is hollow and is in a round shape, and made of metal material, e.g. but not limited to iron.

The first insulation member 20 is hollow, one end thereof is able to be installed in the front cover member 10, and is made of insulation material, e.g. but not limited to plastic.

One end of the electric conduction pin 30 is able to be installed in the first insulation member 20, the other end thereof is able to be installed in the second insulation member 40, and is made of metal material, e.g. but not limited to copper, and two ends thereof are respectively installed with a concave chamber 31 for receiving a conduction wire of a cable (not shown).

The second insulation member 40 is hollow and is served to receive the other end of the electric conduction pin 30, and is made of insulation material, e.g. but not limited to plastic.

The connector 50 is hollow and is served to accommodate the front cover member 10, the first insulation member 20, the electric conduction pin 30 and the second insulation member 40, and is made of metal material, e.g. but not limited to iron; a through hole 51 is longitudinally installed on the connector 50 and two ends of the connector 50 are respectively installed with threads 52 for fastening the cable.

The gas tube 60 is received in the through hole 51, two ends thereof are respectively installed with a contact pad 61, the operating voltage and current of the gas tube 60 is about 6 KV/3000 A.

The top cover 70 is covered on top of the through hole 51 and is in contact with one end of the gas tube 60, and is made of metal material, e.g. but not limited to iron.

The grounding base 80 is installed with a base hole 81 for accommodating the connector 50, and is able to be in contact with one contact pad 61 of the gas tube 60 through the top cover 70, one side of the base hole 81, e.g. but limited to the right side, has a thread hole 82 so that a grounding wire (not shown) is able to be fastened by a locking member 83, and the grounding base 80 is made of metal material, e.g. but not limited to iron. Two ends of the grounding base 80 are respectively installed with a locking hole 84 for fastening the grounding base 80.

When being assembled, the electric conduction pin 30 is firstly connected to the first insulation member 20 and the second insulation member 40; the front cover member 10 is covered on one end of the first insulation member 20; the front cover member 10, the first insulation member 20 and the second insulation member 40 are installed in the connector 50; the gas tube 60 is installed in the through hole 51, and the top cover 70 is covered; the connector 50 is installed in the base hole 81 so the top cover 70 is in contact with the grounding base 80; the grounding base 80 is fastened with an electric device, e.g. but not limited to a cable splitter; lastly the grounding wire is fastened in the thread hole 82 through the locking member 83; the assembly of the present invention is finished.

When being used, a female cable joint (not shown) is coupled to one end of the connector 50, another female cable joint (not shown) is coupled to the other end of the connector 50 so as to finish the connection; when a lightning strikes, the high voltage electricity is guided to the ground through the gas tube 60, the top cover 70, the connector 50, the grounding base 80 and the grounding wire, so the damage to the electric device caused by the lightning is reduced.

Figure 5:
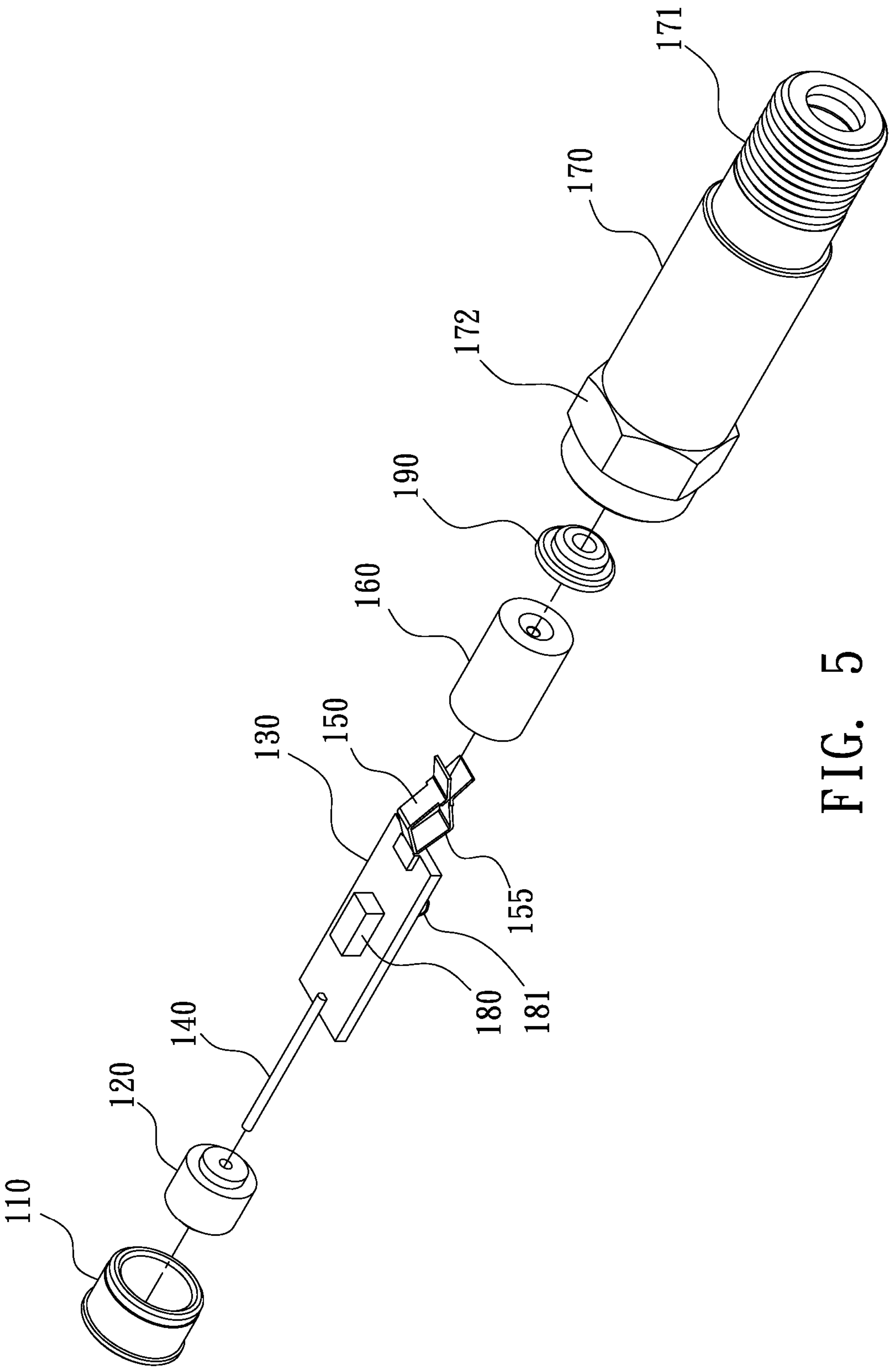
FIG. 5 is a schematic exploded view of a lightning protection device of another preferred embodiment of the present invention.
Figure 6:
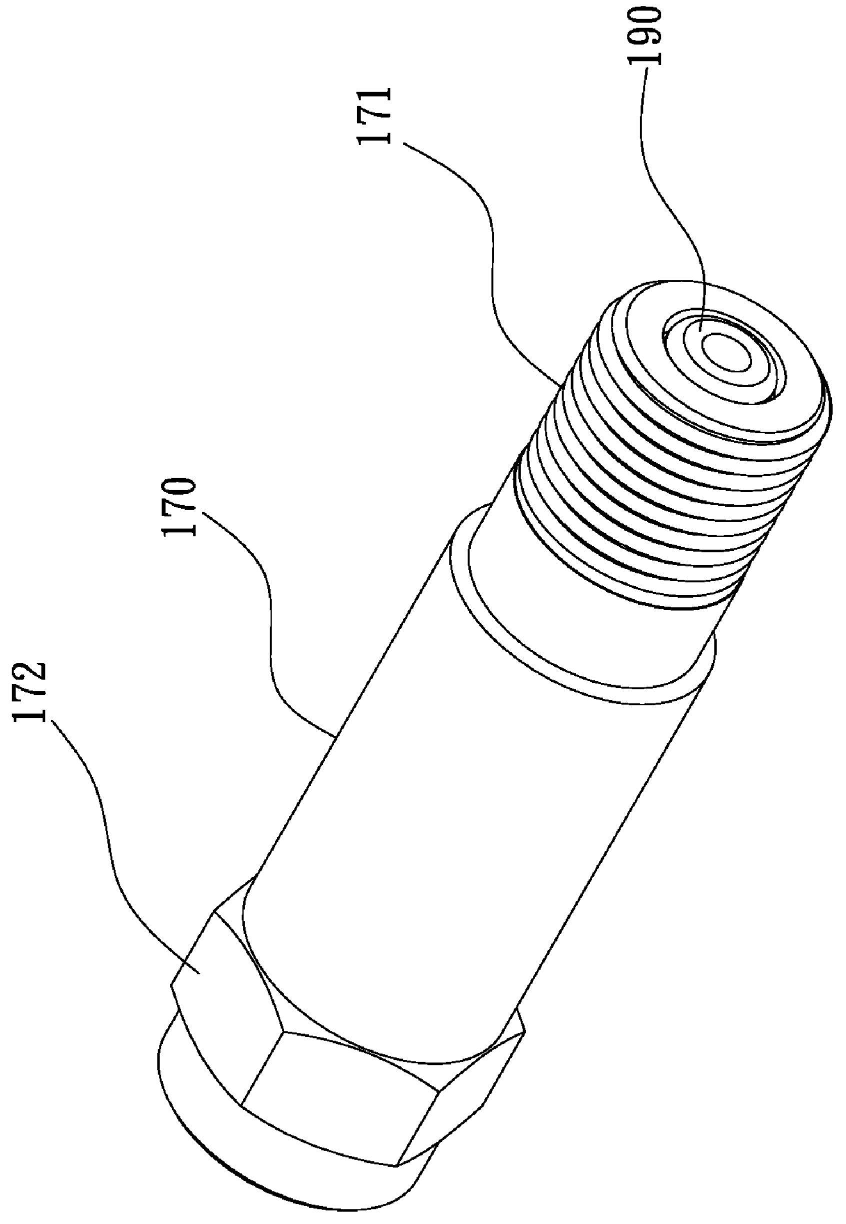
FIG. 6 is a schematic perspective view of the assembly of the lightning protection device of another preferred embodiment of the present invention.
Figure 7:
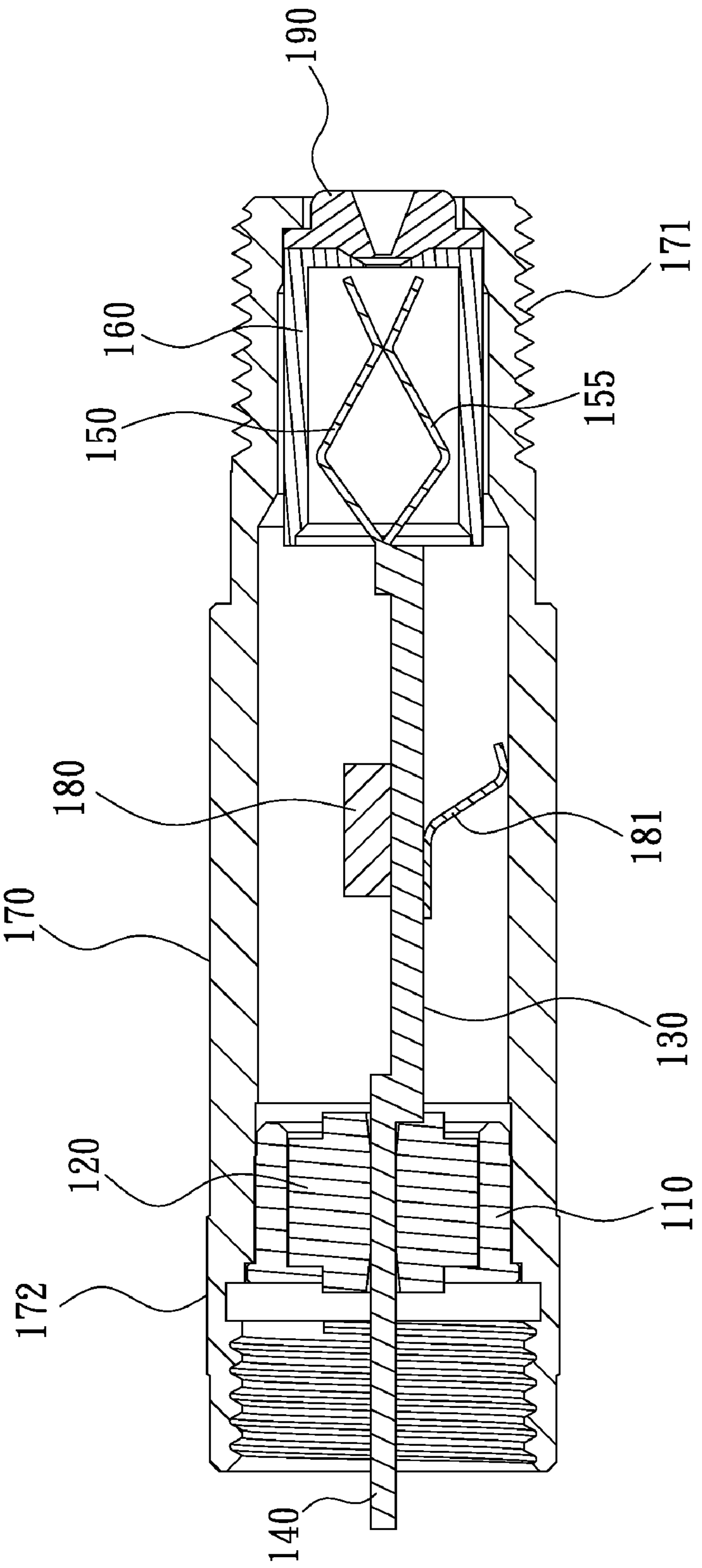
FIG. 7 is a schematic cross-sectional view of the assembly of the lightning protection device of another preferred embodiment of the present invention.

Referring from FIG. 5 to FIG. 7, wherein FIG. 5 is a schematic exploded view of a lightning protection device of another preferred embodiment of the present invention; FIG. 6 is a schematic perspective view of the assembly of the lightning protection device of another preferred embodiment of the present invention; FIG. 7 is a schematic cross-sectional view of the assembly of the lightning protection device of another preferred embodiment of the present invention.

As shown in figures, the lightning protection device of another preferred embodiment of the present invention, more particularly to a male-female lightning protection device, comprises: a front cover member 110, a first insulation member 120; a printed circuit board 130; an electric conduction pin 140; two electric conduction sheets 150, 155; a second insulation member 160; a connector 170; and a gas tube 180.

The front cover member 110 is hollow and is in a round shape, and is made of metal material, e.g. but not limited to iron.

The first insulation member 120 is hollow, one end thereof is able to be received in the front cover member 110, and is made of insulation material, e.g. but not limited to plastic.

The printed circuit board 130 is served to carry the gas tube 180 and let the electric conduction pin 140 and the two electric conduction sheets 150, 155 to be fastened thereon.

One end of the electric conduction pin 140 is received in the first insulation member 120 and the other end thereof is fastened on the printed circuit board 130, and is made of metal material, e.g. but not limited to copper.

The two electric conduction sheets 150, 155 are respectively in a bended shape, one end thereof is fastened on the printed circuit board 130 and the front end is in a closed status for an insertion purpose.

The second insulation member 160 is hollow and is served to received the other ends of the two electric conduction sheets 150, 155, and is made of insulation material, e.g. but not limited to plastic.

The connector 170 is hollow and is served to accommodate the front cover member 110, the first insulation member 120, the printed circuit board 130, the electric conduction pin 140, the two electric conduction sheets 150, 155 and the second insulation member 160, and is made of metal material, e.g. but not limited to iron. One end of the connector 170 is installed with threads 171 for fastening a cable, the other end thereof is installed with a hexangular convex part 172.

The gas tube 180 is installed on the printed circuit board 130, and is able to be in contact with the connector 170 through a resilient grounding sheet 181, the operating voltage and current of the gas tube 180 is about 6 KV/3000 A.

The lightning protection device provided by the present invention is further installed with a rubber pad 190 which is disposed between the second insulation member 160 and the connector 170 and is served to provide a waterproof function to the two electric conduction sheets 150, 155.

When being assembled, the electric conduction pin 140 and the two electric conduction sheets 150, 155 are firstly welded and fastened on the printed circuit board 130; the electric conduction pin 140 and the two electric conduction sheets 150, 155 are respectively connected to the first insulation member 120 and the second insulation member 160; the front cover member 110 is covered at one end of the first insulation member 120; the rubber pad 190 is installed in the connector 170; lastly the rubber pad 190, the first insulation member 120 and the second insulation member 160 are installed in the connector 170, so the assembly of the present invention is finished.

When being used, a male cable joint (not shown) is inserted at one end of the connector 170, a female cable joint (not shown) is inserted at the other end of the connector 170 so as to form a connection. When a lightning strikes, the high voltage electricity is guided to the ground through the gas tube 180, the resilient grounding sheet 181 and the connector 170, so the damage to the electric device caused by the lightning is reduced.

Figure 8:
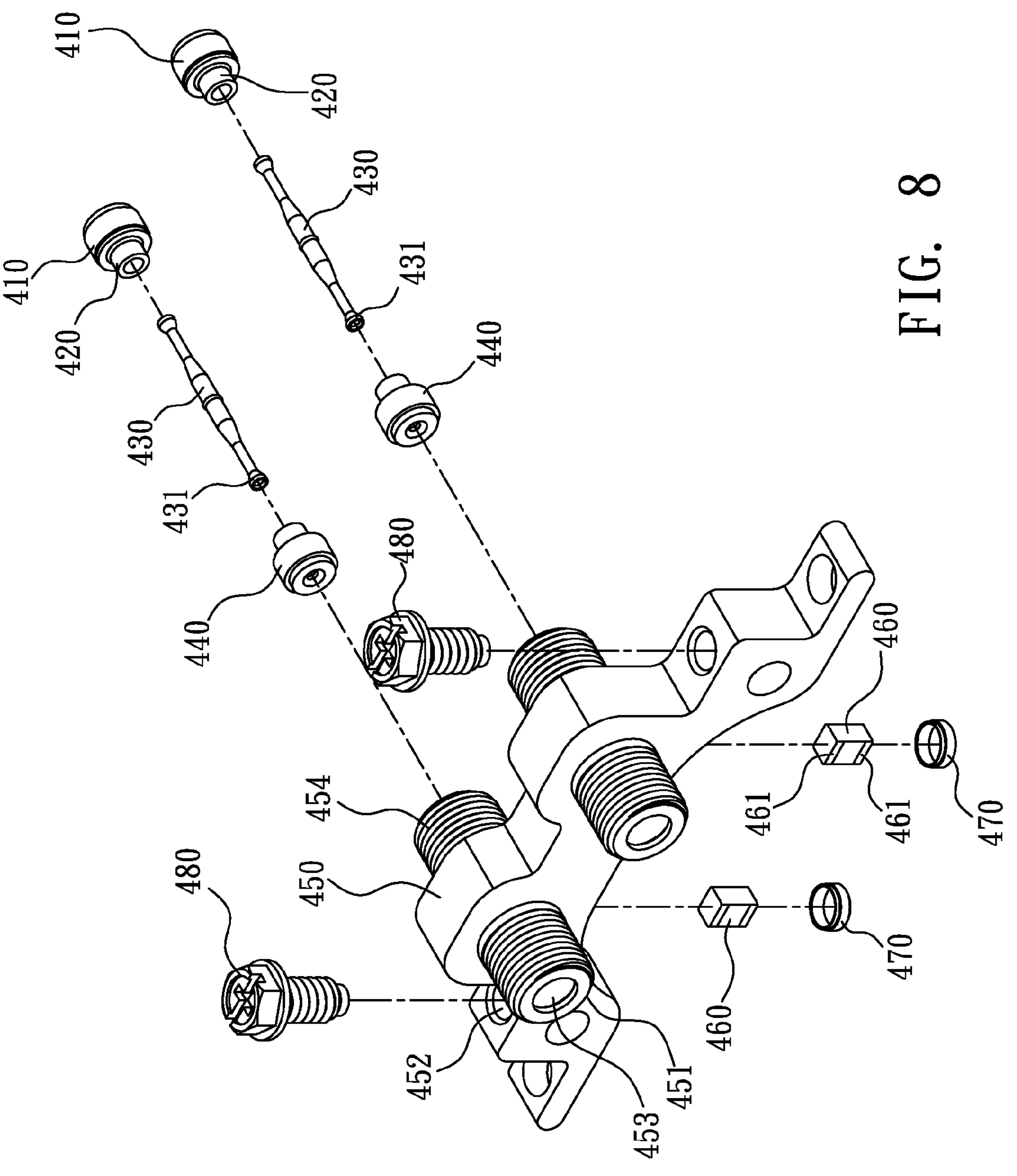
FIG. 8 is a schematic exploded view of a lightning protection device of one another preferred embodiment of the present invention.
Figure 9:
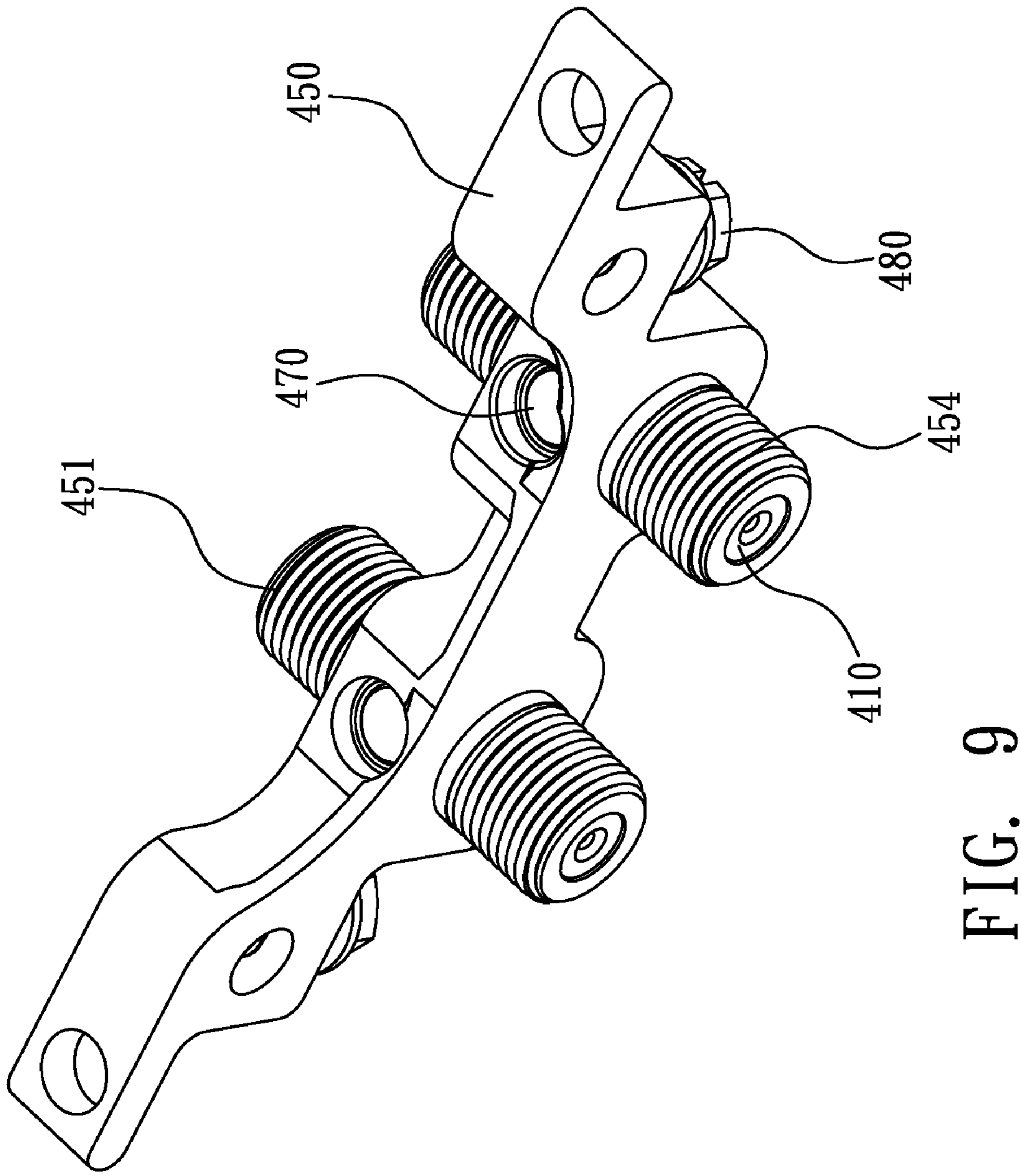
FIG. 9 is a schematic perspective view of the assembly of the lightning protection device of one another preferred embodiment of the present invention.

Referring to FIG. 8 and FIG. 9, wherein FIG. 8 is a schematic exploded view of a lightning protection device of one another preferred embodiment of the present invention; FIG. 9 is a schematic perspective view of the assembly of the lightning protection device of one another preferred embodiment of the present invention.

As shown in figures, the lightning protection device provided by the present invention, more particularly to a female-female lightning protection device, comprises: a front cover member 410; a first insulation member 420; an electric conduction pin 430; a second insulation member 440; a grounding base 450; a gas tube 460; and a bottom cover 470.

The front cover member 410 is hollow and in a round shape, and made of metal material, e.g. but not limited to iron.

The first insulation member 420 is hollow, one end thereof is received in the front cover member 410, and made of insulation material, e.g. but not limited to plastic.

One end of the electric conduction pin 430 is received in the first insulation member 420 and the other end thereof is received in the second insulation member 440, the electric conduction pin 430 is made of metal material, e.g. but not limited to copper, and two ends thereof are respectively installed with a concave chamber 431 for receiving a conduction wire of a cable (not shown).

The second insulation member 440 is hollow and is served to receive the other end of the electric conduction pin 430, and is made of insulation material, e.g. but not limited to plastic.

The grounding base 450 is installed with a connector 451, and at least one end of the grounding base 450 is installed with a screw hole 452 for fastening a grounding wire (not shown) through a locking member 480; wherein the connector 451 is hollow and served to accommodate the front cover member 410, the first insulation member 420, the electric conduction pin 430 and the second insulation member 440; a through hole 453 is longitudinally installed in the grounding base 450 and the connector 451, the connector 451 is made of metal material, e.g. but not limited to iron, and the grounding base 450 and the connector 451 are preferably formed as one piece. Two ends of the connector 451 are respectively installed with threads 454 for screw-fitting the cable.

The gas tube 460 is installed in the through hole 453, two ends thereof are respectively installed with a contact pad 461; the operating voltage and current of the gas tube 460 is about 6 KV/3000 A.

The bottom cover 470 covers the through hole 453 through the bottom end of the grounding base 450 and is in contact with one end of the gas tube 460; the bottom cover 470 is made of metal material, e.g. but not limited to iron.

The assembly and operation of the lightning protection device mentioned in this embodiment can be referred to FIG. 3 and FIG. 4 so no further illustration is provided.

As mention above, in the present invention, a through hole is installed on a connector and a gas tube is disposed in the through hole, and the gas tube is in contact with a grounding base through a top cover to achieve the object of lightning protection; and the present invention has advantages of reducing components installed, reducing volume and lowering production cost.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lightning protection device, comprising:
- a front cover member that is hollow;
- a first insulation member that is hollow, one end thereof being received in the front cover member;
- an electric conduction pin, one end thereof being received in the first insulation member;
- a second insulation member that is hollow and serving to receive the other end of the electric conduction pin;
- a connector that is hollow and serving to accommodate the front cover member, the first insulation member, the electric conduction pin and the second insulation member, a through hole being longitudinally installed in the connector;
- a gas tube installed in the through hole;
- a top cover covered on top of the through hole and in contact with one end of the gas tube; and
- a grounding base having a base hole for accommodating the connector and being in contact with the top cover, a screw hole being installed at one end of the base hole for fastening a locking member.

2. The lightning protection device according to claim 1, wherein the front cover member, the electric conduction pin, the connector, the top cover and the grounding base are made of metal material.

3. The lightning protection device according to claim 1, wherein the first insulation member and the second insulation member are made of insulation material.

4. The lightning protection device according to claim 1, wherein two ends of the electric conduction pin are respectively installed with a concave chamber for receiving a conduction wire of a cable.

5. The lightning protection device according to claim 4, wherein two ends of the connector are respectively installed with threads for screw-fitting the cable.

6. The lightning protection device according to claim 1, wherein two ends of the grounding base are respectively installed with a locking hole for fastening the grounding base.

7. A lightning protection device, comprising:
- a front cover member that is hollow;
- a first insulation member that is hollow, one end thereof being received in the front cover member;
- a printed circuit board;
- an electric conduction pin, one end thereof being received in the first insulation member and the other end thereof being fastened at one end of the printed circuit board;
- two electric conduction sheets, respectively in a bended shape, one end thereof being fastened on the other ends of the printed circuit board and the front end thereof being in a closed status;
- a second insulation member that is hollow and serving to receive the other ends of the two electric conduction sheets;
- a connector that is hollow and serving to accommodate the front cover member, the first insulation member, the electric conduction pin, the printed circuit board, the two electric conduction sheets and the second insulation member, aligned through an axis; and
- a gas tube installed on the printed circuit board and in contact with the connector through a conduction wire.

8. The lightning protection device according to claim 7, wherein the front cover member, the electric conduction pin, the connector and the two electric conduction sheets are made of metal material.

9. The lightning protection device according to claim 7, wherein the first insulation member and the second insulation member are made of insulation material.

10. The lightning protection device according to claim 7, wherein one end of the connector is installed with threads for screw-fitting a cable, the other end thereof is installed with a hexangular convex part.

11. The lightning protection device according to claim 7, wherein the lightning protection device is further installed with a rubber pad between the second insulation member and the connector for providing a waterproof function.

12. A lightning protection device, comprising:

a front cover member that is hollow;

a first insulation member that is hollow, one end thereof being received in the front cover member;

an electric conduction pin, one end thereof being received in the first insulation member;

a second insulation member that is hollow and serving to receive the other end of the electric conduction pin;

a grounding base having a connector and at least one end of the grounding base being installed with a screw hole for fastening a locking member; wherein the connector is hollow and serving to accommodate the front cover member, the first insulation member, the electric conduction pin and the second insulation member, a through hole being longitudinally installed in the grounding base and the connector;

a gas tube installed in the through hole; and a bottom cover serving to cover the through hole and being in contact with one end of the gas tube.

13. The lightning protection device according to claim 12, wherein the front cover member, the electric conduction pin, the connector, the bottom cover and the grounding base are made of metal material, and the grounding base and the connector are formed in one piece.

14. The lightning protection device according to claim 12, wherein the first insulation member and the second insulation member are made of insulation material.

15. The lightning protection device according to claim 12, wherein two ends of the electric conduction pin are respectively installed with a concave chamber for receiving a conduction wire of a cable.

16. The lightning protection device according to claim 15, wherein two ends of the connector are respectively installed with threads for screw-fitting the cable.

17. The lightning protection device according to claim 12, wherein two ends of the grounding base are respectively installed with a locking hole for fastening the grounding base.

* * * * *